W. J. FLEMMING.
CONDENSER AND MOLD FOR CARBON DIOXID.
APPLICATION FILED AUG. 23, 1909.
955,454.
Patented Apr. 19, 1910.
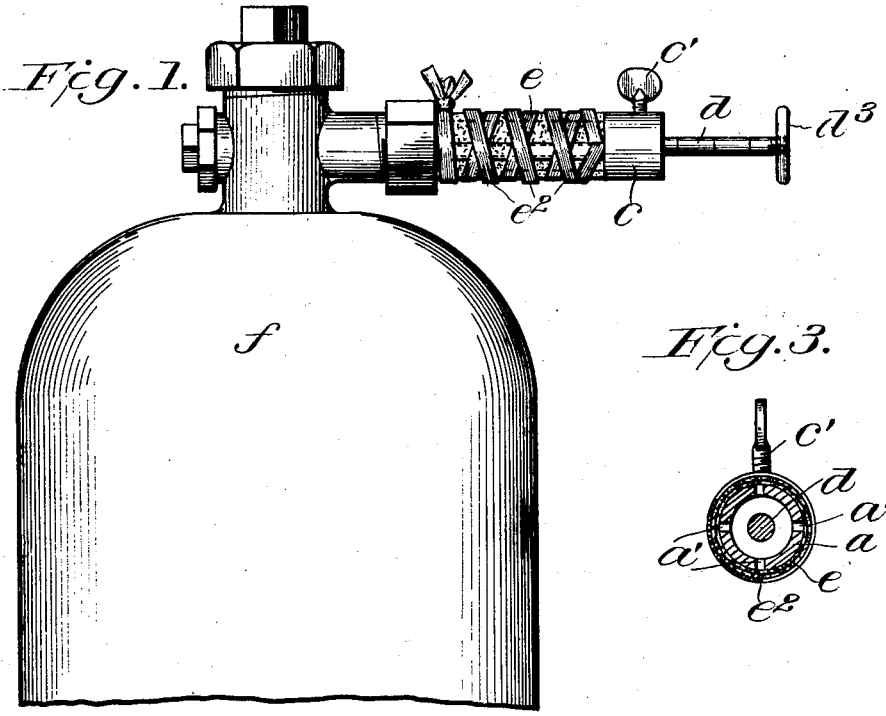
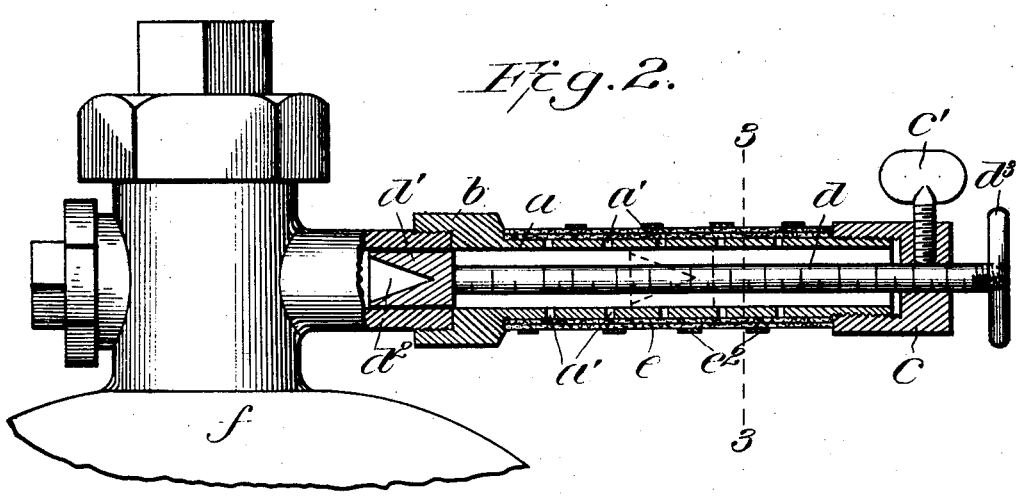

UNITED STATES PATENT OFFICE.

WILLIAM JAMES FLEMMING, OF RICHMOND HILL, NEW YORK.

CONDENSER AND MOLD FOR CARBON DIOXID.

955,454.  Specification of Letters Patent.  Patented Apr. 19, 1910.

Application filed August 23, 1909. Serial No. 514,241.

To all whom it may concern:

Be it known that I, WILLIAM J. FLEMMING, of Richmond Hill, in the county of Queens and State of New York, have invented certain new and useful Improvements in Condensers and Molds for Carbon Dioxid; and I hereby declare that the following is a full, clear, and exact description thereof, reference being had to the accompanying drawings, which form part of this specification.

This invention is a novel device for condensing carbon dioxid gas as it escapes from a liquid carbon dioxid container, and molding same into pencils or sticks that can be conveniently used in dental and surgical operations for producing local anesthesia, the removal of superficial epitheliomata, and skin diseases, and in various operations in the treatment of diseases.

The apparatus comprises a novel device which can be readily attached to the outlet of the tanks or containers which are commonly employed in commerce for shipping liquefied carbon dioxid; the gas permitted to escape from such a container through this apparatus is precipitated therein in the form of crystals which can be packed in the shape of sticks or pencils and which can be readily removed for use.

I term the device a carbon dioxid condenser and mold and will now describe the same with reference to the accompanying drawings in which one practical form of the apparatus is illustrated.

In said drawings, Figure 1 is a side view of the device attached to a carbon dioxid container. Fig. 2 is an enlarged sectional view of Fig. 1. Fig. 3 is a cross section on line 3—3, Fig. 2.

The device comprises a cylinder $a$ provided with a series of perforations or vent holes $a'$, and has an internally threaded flange $b$ on one end adapted to be screwed onto the outlet $f$ of a carbon dioxid flask or container F such as is commonly used for transportation of liquefied carbon dioxid. The other end of cylinder $a$ is closed by a cap $c$ which may be screwed thereon as shown, and is provided with an axial passage for a stem $d$ connected to a plunger $d'$ in the cylinder; which plunger preferably has a conical recess $d^2$ in its inner end. The stem $d$ is preferably provided with graduating marks, as shown, so that the position to which the plunger $d'$ is adjusted, and the distance of the plunger from the flanged end $b$ of the cylinder, can be easily determined, so that sticks of crystallized carbon dioxid of any desired length may be produced.

The stem may be provided with a hand piece $d^3$ on its outer end whereby it can be conveniently manipulated. The stem can be fastened in any position to which it is adjusted by means of a thumb-screw $c'$ tapped through a radial threaded hole in the cap $c$.

In one practical construction of the device I preferably make the cylinder $a$ of steel tubing $3\frac{1}{2}$ inches long provided with sixteen or more perforations $a'$ arranged in four rows and equally spaced apart; and the flange $b$ is $\frac{3}{4}$ of an inch in diameter on the inside and threaded to fit the diameter of the outlet nipple $f$ of the ordinary commercial tank F; and the plunger or piston $d'$ is preferably of brass. The size of the cylinders may of course be varied to produce sticks of carbon dioxid of any desired size. When the cylinders are enlarged the number of holes $a'$ should be increased. The object of these holes is, as hereinafter explained, to permit the escape of the gas; but in order to retard the escape of the gas I use in connection with, and as a practical part of the apparatus, a jacket $e$ which is wide enough to cover all the holes in the cylinder and is preferably long enough to wrap around the cylinder two or more times. This jacket is wrapped tightly around the cylinder as shown, and is preferably securely fastened in place by suitable devices, a convenient means being tapes $e^2$ which are wrapped criss-cross around the jacket and tied so as to retain the jacket securely in place.

When it is desired to use the device the plunger is adjusted to the desired position and fastened by screw $c'$; the cylinder is wrapped within the jacket and screwed onto the outlet $f$ of a liquid carbon dioxid container, as indicated in the drawings; the container valve is then partly opened to permit the vaporized liquid carbon dioxid gas to escape into the cylinder $a$; the gas is ordinarily at a temperature of from minus 60 to minus 90 degrees centigrade, and can escape only very slowly from the cylinder through the perforations $a'$, and the surrounding jacket and rapidly cools the cylinder. The gas is also precipitated or condensed in the cylinder in the form of crystals, like frost or snow; and when the container valve is fully opened the outflowing gas comes into contact with the layer of snow or crystallized carbon dioxid already formed in the cylinder and more gas is rapidly condensed in the cylinder in the form of crystals, until a stick of snow-like carbon dioxid is formed.

The plunger is set according to the length of the stick of snow desired; thus if two inches are wanted the stem is locked when the mark 2 on the scale numbers is at the outer edge of cap $c'$. The stick of snow can be condensed by loosening the thumb-screw and pushing the plunger as far in as it will go, which compresses the snow against the valve at the base of the nipple. Then the plunger is brought back to place and the pressure of gas forces the stick of snow outwardly in the cylinder and more crystals are formed until the space in the cylinder is solidly filled; then the tank valve is closed, the device unscrewed from the tank nipple, and the stick of carbon dioxid crystal ejected from the cylinder by the plunger. I also propose to make condensers and molds with cylinders ½ inch in internal diameter, in which case I shall provide them with thirty-two holes instead of sixteen. It is obvious that variations may be made in the form and construction of the device within the scope of the invention, the essential object of my invention being to condense carbon dioxid gas as drawn from a liquid gas tank into snow and mold it into practical form.

Having described my invention what I claim as new and desire to secure by Letters Patent thereon is:

1. A condenser and mold for liquid carbon dioxid comprising a cylinder adapted to be connected to the outlet of a liquid carbon dioxid container, an adjustable plunger in said cylinder, and means to retard the escape of the gas from the cylinder.

2. A condenser and mold for liquid carbon dioxid, comprising a perforated cylinder adapted to be connected to the outlet of a carbon dioxid container, an adjustable plunger in said cylinder, and a flexible wrapper for the cylinder adapted to retard the escape of gas therefrom.

3. A carbon dioxid condenser and mold comprising a cylinder having a cap on one end and an internally threaded flange on the other end whereby it may be connected to a liquid carbon dioxid supply, an adjustable plunger in said cylinder, and means for retarding the escape of gas from the cylinder.

4. A carbon dioxid condenser and mold comprising a cylinder adapted to be attached to the outlet of a liquid carbon dioxid container, an adjustable plunger in said cylinder, a graduated stem connected with said plunger, and means for retarding the escape of gas from the cylinder.

5. A carbon dioxid condenser and mold comprising a perforated cylinder adapted to be attached to the outlet of a liquid carbon dioxid container, an adjustable plunger in said cylinder, and a fibrous jacket adapted to be wrapped around the cylinder to prevent too rapid escape of the gas therefrom.

6. A carbon dioxid condenser and mold comprising a perforated cylinder having a cap on one end, an internally threaded flange on the other end whereby it may be attached to the outlet of a liquid carbon dioxid container, an adjustable plunger in said cylinder, a stem connected with said plunger, and a fibrous jacket adapted to be wrapped around the cylinder to prevent too rapid escape of the gas therefrom.

In testimony that I claim the foregoing as my own, I affix my signature in presence of two witnesses.

WILLIAM JAMES FLEMMING.

Witnesses:
 FRANK S. HARLOW,
 J. EDWARD MACDERMOTT.